(12) United States Patent
Schnell et al.

(10) Patent No.: US 12,668,508 B2
(45) Date of Patent: Jun. 30, 2026

(54) HEAT EXCHANGER, METHOD OF OPERATING A HEAT EXCHANGER AND PROCESS WATER DISTILLATION SYSTEM

(71) Applicant: KMU LOFT Cleanwater SE, Kirchentellinsfurt (DE)

(72) Inventors: Manfred Schnell, Schopfheim (DE); Juergen Braun, Neustetten (DE)

(73) Assignee: KMU LOFT Cleanwater SE, Kirchentellinsfurt (DE)

( * ) Notice: Subject to any disclaimer, the term of this patent is extended or adjusted under 35 U.S.C. 154(b) by 198 days.

(21) Appl. No.: 18/293,473

(22) PCT Filed: Jul. 26, 2022

(86) PCT No.: PCT/EP2022/070971
§ 371 (c)(1),
(2) Date: Jan. 30, 2024

(87) PCT Pub. No.: WO2023/006763
PCT Pub. Date: Feb. 2, 2023

(65) Prior Publication Data
US 2024/0424425 A1     Dec. 26, 2024

(30) Foreign Application Priority Data
Jul. 30, 2021     (DE) .......................... 102021119867.4

(51) Int. Cl.
*C02F 1/04*          (2023.01)
*B01D 1/00*          (2006.01)
(Continued)

(52) U.S. Cl.
CPC ............ *C02F 1/048* (2013.01); *B01D 1/0041* (2013.01); *B01D 1/28* (2013.01); *B01D 5/0039* (2013.01);
(Continued)

(58) Field of Classification Search
CPC ...... B01D 5/0039; B01D 1/0041; B01D 1/28; B01D 5/006; C02F 1/041; C02F 1/043;
(Continued)

(56) References Cited

U.S. PATENT DOCUMENTS 6,516,627 B2 *   2/2003   Ring ..................... F25B 31/004
62/193

FOREIGN PATENT DOCUMENTS

CN          102309868 A       1/2012
DE          69513582 T2       5/2000
(Continued)

*Primary Examiner* — Renee Robinson
(74) *Attorney, Agent, or Firm* — Hayes Soloway PC

(57)          ABSTRACT

A heat exchanger which is particularly suitable for use in a process water distillation system comprises a first flow path configured to be flown through with a first fluid to be heated und a second flow path configured to be flown through with a second fluid to be cooled. The second flow path is in thermal contact with the first flow path at least in sections, and the second flow path is designed such that a flow of the second fluid, upon being fed into the second flow path and/or upon flowing through the second flow path, is calmed. A suction device is configured to suck a fluid component, which separates from the second fluid while the second fluid is supplied into the second flow path and/or flows through the second flow path, from a surface of the second fluid in the second flow path.

14 Claims, 6 Drawing Sheets

(51) Int. Cl.
    *B01D 1/28*         (2006.01)
    *B01D 5/00*         (2006.01)
    *F28D 7/16*         (2006.01)

(52) U.S. Cl.
    CPC .............. *B01D 5/006* (2013.01); *C02F 1/041*
        (2013.01); *C02F 1/043* (2013.01); *F28D 7/16*
           (2013.01); *F28D 7/1607* (2013.01); *C02F*
                          *2303/10* (2013.01)

(58) Field of Classification Search
    CPC .......... C02F 1/048; F28D 7/16; F28D 7/1607;
                                F28B 9/08
    See application file for complete search history.

(56)                 References Cited

FOREIGN PATENT DOCUMENTS

| | | | |
|---|---|---|---|
| DE | 102005049923 | A1 | 4/2007 |
| DE | 102018118026 | | 1/2019 |
| EP | 0854129 | A1 | 7/1998 |
| EP | 1775265 | A2 | 4/2007 |
| JP | 2014020723 | A | 2/2014 |

\* cited by examiner

HEAT EXCHANGER, METHOD OF OPERATING A HEAT EXCHANGER AND PROCESS WATER DISTILLATION SYSTEM

CROSS-REFERENCES TO RELATED APPLICATIONS

This patent application is a national stage entry under 35 U.S.C. § 371 of PCT International Patent Application No. PCT/EP2022/070971, filed on Jul. 26, 2022, which claims the benefit of and priority to German Patent Application No. 10 2021 119 867.4, filed on Jul. 30, 2021. Each of these patent applications is herein incorporated by reference in its entirety.

FIELD OF THE DISCLOSURE

The invention relates to a heat exchanger which is particularly suitable for use in a process water distillation system. The invention also relates to a method for operating such a heat exchanger and to a process water distillation system equipped with such a heat exchanger.

BACKGROUND OF THE DISCLOSURE

The treatment of industrial waste water by vacuum distillation is an effective and at the same time economical process for purifying contaminated liquids which are produced, for example, as washing solutions in immersion, spray and ultra-sonic cleaning systems, as process solutions in surface finishing processes, such as electroplating, pickling, anodizing, vibratory grinding, degreasing, phosphating, burnishing, powder coating or painting, or in drilling, cutting, grinding and drawing applications as well as in die casting. These liquids can be contaminated by solvents, oils, waxes, hydraulic fluids and/or coolants, for example.

DE 10 2005 049 923 B4 discloses a distillation system for purifying industrially contaminated waste water/process water. The distillation system comprises a vessel with an evaporator/condenser unit, as well as a vapor compressor, which provides the pressure conditions required for evaporation/condensation in the distillation system. The evaporator unit serves to evaporate contaminated liquid supplied to the vessel, wherein undesirable components such as silicones, siloxanes, glycols, waxes, oils, amines, emulsifiers, surfactants, salts, etc. collect in an evaporator sump in a bottom area of the vessel. Purified water vapor, on the other hand, rises in the vessel and is first sucked out of the vessel by the vapor compression unit above a mist separator and then conveyed into the condenser unit, which in turn is located inside the vessel. In the condenser unit, the water vapor condenses into purified distillate, which is then supplied to a distillate cooler. The distillate cooler also serves as a preheater for the contaminated liquid to be supplied to the vessel or the evaporator unit.

SUMMARY OF THE DISCLOSURE

The invention is directed to the object of providing a heat exchanger which is particularly suitable for use as a process water preheater/distillate cooler in a process water distillation system. Furthermore, the invention is directed to the object of providing a method for operating such a heat exchanger and a process water distillation system equipped with such a heat exchanger.

A heat exchanger which is particularly suitable for use in a process water distillation system comprises a first flow path configured to be flown through with a first fluid to be heated and a second flow path configured to be flown through with a second fluid to be cooled. The second flow path is in thermal contact with the first flow path at least in sections, so that during operation of the heat exchanger, heat is transferred from the second fluid flowing through the second flow path to the first fluid flowing through the first flow path.

The first fluid may contain various components, in particular water and water-soluble or water-insoluble impurities. When the heat exchanger is installed in a process water distillation system, the first fluid preferably is process water to be purified using the process water distillation system. The second fluid preferably contains components with a different specific density. For example, the second fluid may be distillate emerging from a condenser of a process water distillation system and, in addition to water, may also contain light liquids, such as petrol, benzene, lubricants or oils, which cannot be removed or cannot be completely removed from the process water by the distillation process. The heat exchanger can thus be used, for example, as a process water preheater/distillate cooler in a process water distillation system.

The second flow path of the heat exchanger is designed such that a flow of the second fluid, upon being fed into the second flow path and/or upon flowing through the second flow path, is calmed. For this purpose, the second flow path may, for example, be designed such that the second flow path has a larger flow cross-section than a supply line through which the second fluid is conducted into the second flow path of the heat exchanger. Additionally or alternatively, the second flow path may be designed such that a surface area of the second fluid increases when the second fluid is fed into the second flow path. The calming of the flow of the second fluid that occurs when it is fed into the second flow path and/or when it flows through the second flow path reduces turbulences, so that the flow of the second fluid in the second flow path preferably is or becomes essentially laminar. In addition, the flow velocity of the second fluid, upon being fed into the second flow path and/or upon flowing through the second flow path, can be reduced.

Due to the calming of the flow of the second fluid in the second flow path, segregation of the second fluid occurs under the influence of gravity, at least when the second fluid contains fluid components of different specific densities. In particular, fluid components of lower specific density, such as droplets of light liquid, collect on a surface of the second fluid and form a floating layer there. The heat exchanger therefore further comprises a suction device configured to suck a fluid component, which separates from the second fluid while the second fluid is fed into the second flow path and/or flows through the second flow path, from a surface of the second fluid in the second flow path.

Consequently, the heat exchanger not only fulfills a heat exchanger function, but also a separator function and can therefore be used as a combined heat exchanger/oil separator in a process water distillation system, for example. This makes it possible to dispense with a separate oil separator downstream of the heat exchanger, thus saving costs and, in particular, installation space.

At least a section of the second flow path may be defined by an internal volume of a vessel in which the first flow path is arranged fluidically separated from the second flow path, so that the second fluid flowing through the second flow path flows around the first flow path. By designing the second flow path in this way, a large surface area of the second fluid can form in the second flow path. This is advantageous for calming the flow of the second fluid in the second flow path and the resulting formation of a floating layer consisting of a fluid component with a lower specific density. In addition, the flow of the second fluid around the first flow path ensures optimum heat transfer between the first and the second fluid. Preferably, the first flow path is arranged in a lower region of the vessel, so that it is ensured that the first flow path, at a sufficient fill level of the second fluid in the second fluid path, i.e. in the inner volume of the vessel, is completely surrounded by the flow of the second fluid.

In at least a section of the second flow path, a plurality of flow-directing elements can be provided, which are arranged one behind another with respect to a main flow direction of the second fluid through the second flow path and offset with respect to one another in a direction perpendicular to the main flow direction of the second fluid through the second flow path. A resulting flow of the second fluid meandering around the main flow direction through the second flow path is realized by the flow-directing elements. This increases the path length covered by the second fluid when flowing through the second flow path and consequently improves the heat transfer between the first fluid and the second fluid.

The term "main flow direction" refers to a direction defined by a connecting line between an upstream end of the second flow path and a downstream end of the second flow path. The terms "upstream" and "downstream" each refer to a direction of flow of a fluid through a flow path. For example, the term "upstream end of the second flow path" refers to an end of the second flow path through which the second fluid is fed into the second flow path. Similarly, the term "downstream end of the second flow path" refers to an end of the second flow path through which the second fluid exits the second flow path after flowing through the second flow path.

An inlet of the second flow path may be designed and arranged such that the second fluid fed into the second flow path is fed into the second flow path substantially parallel to a surface level of the second fluid in the second flow path and/or substantially at a level with a surface level of the second fluid in the second flow path. For example, the inlet of the second flow path may open in an upstream region of the second flow path into an upper region of the vessel, the internal volume of which defines at least a section of the second flow path.

By designing and arranging the inlet of the second flow path in this way, a "gentle", vortex-free inlet of the second fluid into the second flow path can be achieved. This promotes the desired calming of the flow of the second fluid in the second flow path and the separation of the fluid component to be removed from the second fluid. In addition, mixing of the fluid component to be removed from the second fluid with the rest of the second fluid is minimized.

An outlet of the second flow path preferably is designed and arranged such that the second fluid is discharged from the second flow path after flowing through the second flow path from a sump region of the second flow path. For example, the outlet of the second flow path may be arranged in a downstream region of the second flow path in a bottom region of the vessel, the internal volume of which defines at least a section of the second flow path.

By combining an inlet arranged in the area of a surface level of the second fluid in the second flow path with an outlet arranged in a sump area of the second flow path, a heat flow of the second fluid flowing through the second flow path can be realized, which runs in an essentially diagonal direction from top to bottom through the second flow path.

In contrast, a heat flow of the first fluid flowing through the first flow path runs in a diagonal direction from bottom to top.

The second flow path, the inlet of the second flow path and the outlet of the second flow path may be designed and arranged such that the second fluid flows through the second flow path along the entire length of the second flow path in a constant main flow direction. Alternatively, a flow deflection device may be arranged in the second flow path, which is configured to deflect the flow of the second fluid through the second flow path such that the second fluid flows through the second flow path along a first section of the second flow path in a first main flow direction and along a second section of the second flow path in a second main flow direction opposite to the first main flow direction. A flow reversal of the second fluid in the second flow path enables an increase in the path length covered by the second fluid when flowing through the second flow path and thus an improved heat transfer between the first fluid and the second fluid.

In an embodiment of the heat exchanger, in which a flow reversal of the second fluid is provided in the second flow path, the inlet of the second flow path preferably opens in an upstream region of the first section of the second flow path into an upper region of the vessel, the internal volume of which defines at least a section of the second flow path. The outlet of the second flow path then preferably is arranged in a downstream region of the second section of the second flow path in a bottom region of the vessel, the internal volume of which defines at least a section of the second flow path.

The flow deflection device may comprise a first separating plate which divides the second flow path into the first section and the second section. The first separating plate preferably is designed and arranged such that an upstream region of the first section of the second flow path and a downstream region of the second section of the second flow path are fluidically separated from one another. In addition or alternatively, the separating plate may be designed and arranged such that a downstream region of the first section of the second flow path and an upstream region of the second section of the second flow path are fluidically connected to one another. In the area of the second flow path in which there is a fluid connection between the first section and the second section, the flow of the second fluid can then be reversed.

At least a section of the first flow path preferably is defined by an inner volume of a plurality of tubes arranged substantially parallel to each other. This results in a large contact surface with the second fluid flowing through the second flow path and consequently a good heat transfer between the first and second fluids.

A flow direction of the first fluid through the first flow path preferably is directed opposite to a main flow direction of the second fluid through the second flow path, i.e. the heat exchanger preferably operates in counterflow mode. An inlet of the first flow path may open into a bottom area of an inlet chamber, which in turn is connected to an upstream area of the first flow path. An outlet of the first flow path, on the other hand, may be connected to an upper region of an outlet chamber, which in turn is connected to a downstream section of the first flow path.

The first flow path, the inlet chamber and the outlet chamber may be designed and arranged such that the first fluid flows through the first flow path along the entire length of the first flow path in a constant flow direction. This is particularly useful if the flow direction of the second fluid is not reversed in the second flow path. For example, the inlet chamber and the outlet chamber can be connected to oppo-
site ends of the first flow path, in particular to opposite ends
of the tubes whose internal volume defines the first flow
path.

Alternatively, however, it is also conceivable that the first
flow path, the inlet chamber and the outlet chamber are
designed and arranged such that the first fluid flows through
the first flow path along a first section of the first flow path
in a first flow direction and along a second section of the first
flow path in a second flow direction opposite to the first flow
direction. Such a design of the first flow path, the inlet
chamber and the outlet chamber makes sense if a reversal of
the flow direction of the second fluid is also provided along
the second flow path. This allows the counterflow principle,
in which the flow direction of the first fluid through the first
flow path is opposite to the main flow direction of the second
fluid through the second flow path, to be maintained.

For example, the inlet chamber and the outlet chamber
may be arranged one above another in a direction substan-
tially perpendicular to the first flow direction of the first fluid
along the first section of the first flow path and substantially
perpendicular to the second flow direction of the first fluid
along the second section of the first flow path. When the first
flow path is defined by the inner volume of a plurality of
tubes arranged substantially parallel to each other, the first
section of the first flow path is then preferably formed by a
lower portion of the tube bundle, while the second section of
the first flow path may be formed by an upper portion of the
tube bundle.

The inlet chamber and the outlet chamber may be fluidi-
cally separated from each other by a second separating plate,
so that the first fluid is prevented from entering the outlet
chamber from the inlet chamber without flowing through the
first flow path. The second separating plate is preferably
formed in one piece with the first separating plate, which
fluidically separates an upstream region of the first section of
the second flow path from a downstream region of the
second section of the second flow path.

A downstream end of the first section of the first flow path
and an upstream end of the second section of the first flow
path may be connected to a flow deflection chamber, which
may be designed and arranged such that first fluid flowing in
the first flow direction from the first section of the first flow
path into the flow deflection chamber is deflected and
directed into the second section of the first flow path in the
second flow direction opposite to the first flow direction. For
example, the inlet chamber and the outlet chamber on the
one hand and the flow deflection chamber on the other hand
can be connected to opposite ends of the first flow path, in
particular to opposite ends of the tubes whose internal
volume defines the first flow path.

In a preferred embodiment of the heat exchanger, a
downstream section of the second flow path is connected to
a receiving chamber for receiving the second fluid dis-
charged from the second flow path. The receiving chamber
may comprise a first section and a second section arranged
downstream of the first section. The first section of the
receiving chamber may be separated from the second section
of the receiving chamber by an overflow device, so that
second fluid emerging from the second flow path always
flows first into the first section of the receiving chamber and
only then into the second section of the receiving chamber
via the overflow device.

The overflow device, i.e. the design and arrangement of
the overflow device, determines the fill level of the second
flow path, i.e. the height of the surface level of the second
fluid in the second flow path. In particular, the overflow device is designed and arranged such that the second fluid
flowing through the second flow path flows completely
around the first flow path. If the first flow path is completely
below the surface level of the second fluid in the second flow
path, the heat transfer between the first and the second fluid
is optimized.

At least a section of the first flow path preferably is
designed and arranged such that its outer surface acts as a
coalescing element for improving a separation efficiency of
the fluid component from the second fluid. In particular,
outer surfaces of the tube bundle, the inner volume of which
defines the first flow path, may act as separation surfaces for
the fluid component to be separated from the second fluid.
Small droplets of the fluid component then collect on the
outer surfaces of the tube bundle and combine with other
droplets to form larger droplets. The larger droplets have
more buoyancy and collect on the surface of the second
fluid, where they can be extracted by the suction device.

In a method for operating a heat exchanger in particular
intended for use in a process water distillation system, a first
fluid to be heated is conducted through a first flow path. A
second fluid to be cooled is conducted through a second flow
path, wherein the second flow path is in thermal contact with
the first flow path at least in sections. A flow of the second
fluid, upon being fed into the second flow path and/or upon
flowing through the second flow path, is calmed. As a result,
if the second fluid contains fluid components of different
specific densities, the second fluid segregates under the
influence of gravity and fluid components of lower specific
density, such as droplets of light liquid, collect in the form
of a floating layer on a surface of the second fluid. A fluid
component which separates from the second fluid while the
second fluid is fed into the second flow path and/or flows
through the second flow path is sucked from a surface of the
second fluid.

The second fluid flowing through the second flow path
preferably flows around the first flow path. A flow of the
second fluid through the second flow path may be deflected
by a plurality of flow-directing elements, which are arranged
one behind another with respect to a main flow direction of
the second fluid through the second flow path and offset with
respect to one another in a direction perpendicular to the
main flow direction of the second fluid through the second
flow path. The second fluid may be fed into the second flow
path substantially parallel to a surface level of the second
fluid in the second flow path and/or substantially at a level
with a surface level of the second fluid in the second flow
path. Additionally or alternatively, the second fluid may be
discharged from the second flow path after flowing through
the second flow path from a sump region of the second flow
path.

The second fluid may flow through the second flow path
along the entire length of the second flow path in a constant
main flow direction. Alternatively, however, the flow of the
second fluid through the second flow path may also be
deflected such that the second fluid flows through the second
flow path along a first section of the second flow path in a
first main flow direction and along a second section of the
second flow path in a second main flow direction opposite to
the first main flow direction.

Similarly, the first fluid may flow through the first flow
path along the entire length of the first flow path in a constant
flow direction. Alternatively, however, the first fluid may
flow through the first flow path along a first section of the
first flow path in a first flow direction and along a second
section of the first flow path in a second flow direction
opposite to the first flow direction.

7

The second fluid discharged from the second flow path may be received in a receiving chamber which is connected to a downstream region of the second flow path. The receiving chamber may comprise a first section and a second section arranged downstream of the first section and separated from the first section by an overflow device. The overflow device may be designed and arranged such that the second fluid flowing through the second flow path flows completely around the first flow path.

Furthermore, all the features described above in connection with the design of the heat exchanger can also be implemented in the method described here for operating a heat exchanger.

A process water distillation system comprises an evaporator, a condenser and a compressor configured to generate a desired pressure in at least a region of the process water distillation system and to convey steam from the evaporator into the condenser. Furthermore, the process water distillation system comprises a heat exchanger described above, wherein, during operation of the process water distillation system, the first fluid to be heated, which flows through the first flow path of the heat exchanger, in particular is process water to be purified and the second fluid to be cooled, which flows through the second flow path of the heat exchanger, in particular is distillate emerging from the condenser.

Preferred embodiments of the invention are explained in more detail below with reference to the accompanying schematic drawings, of which:

DETAILED DESCRIPTION OF PREFERRED EMBODIMENTS

Figure 1:
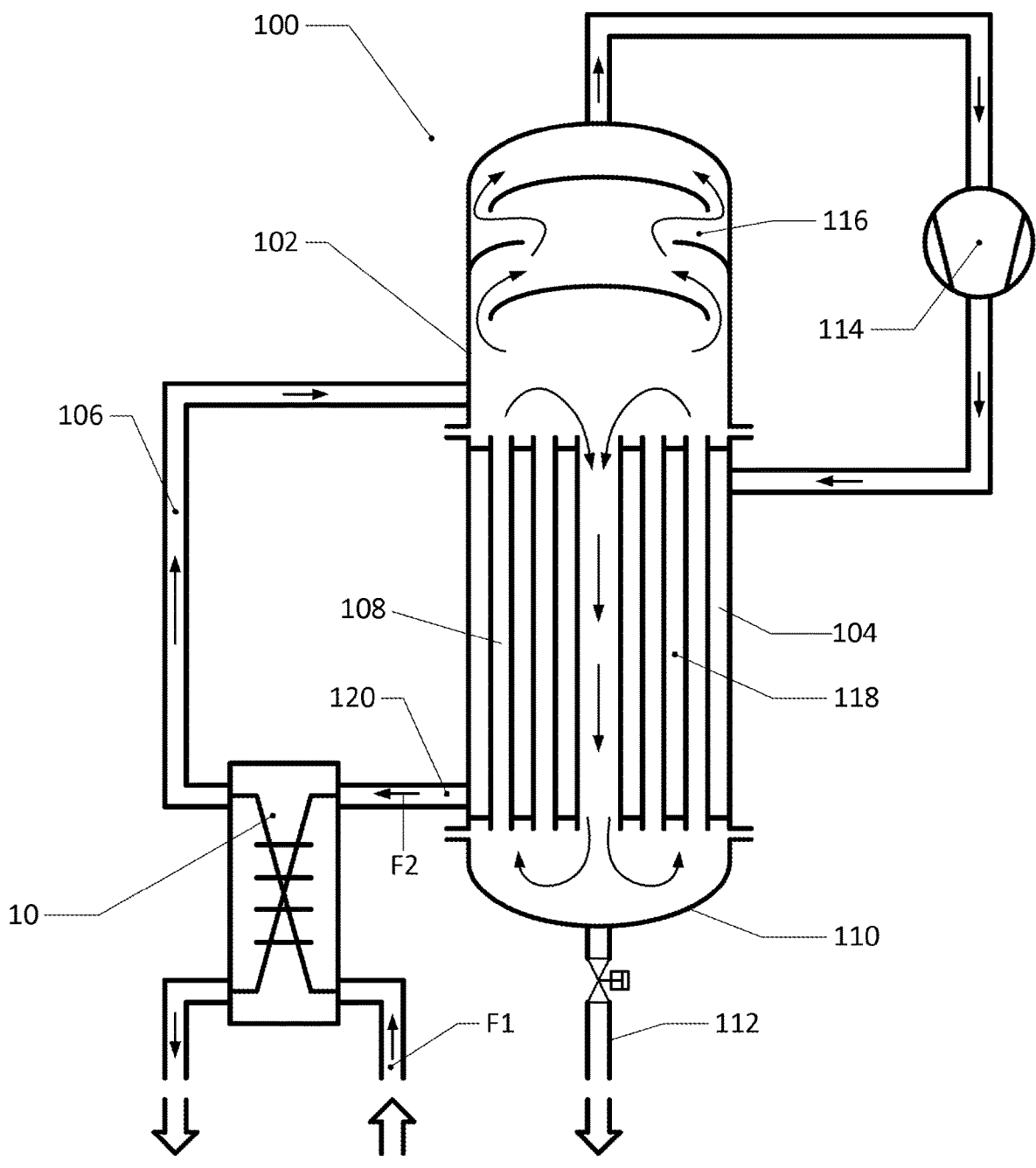
FIG. 1 shows a process water distillation system comprising a heat exchanger serving as a process water preheater/distillate cooler.
Figure 2:
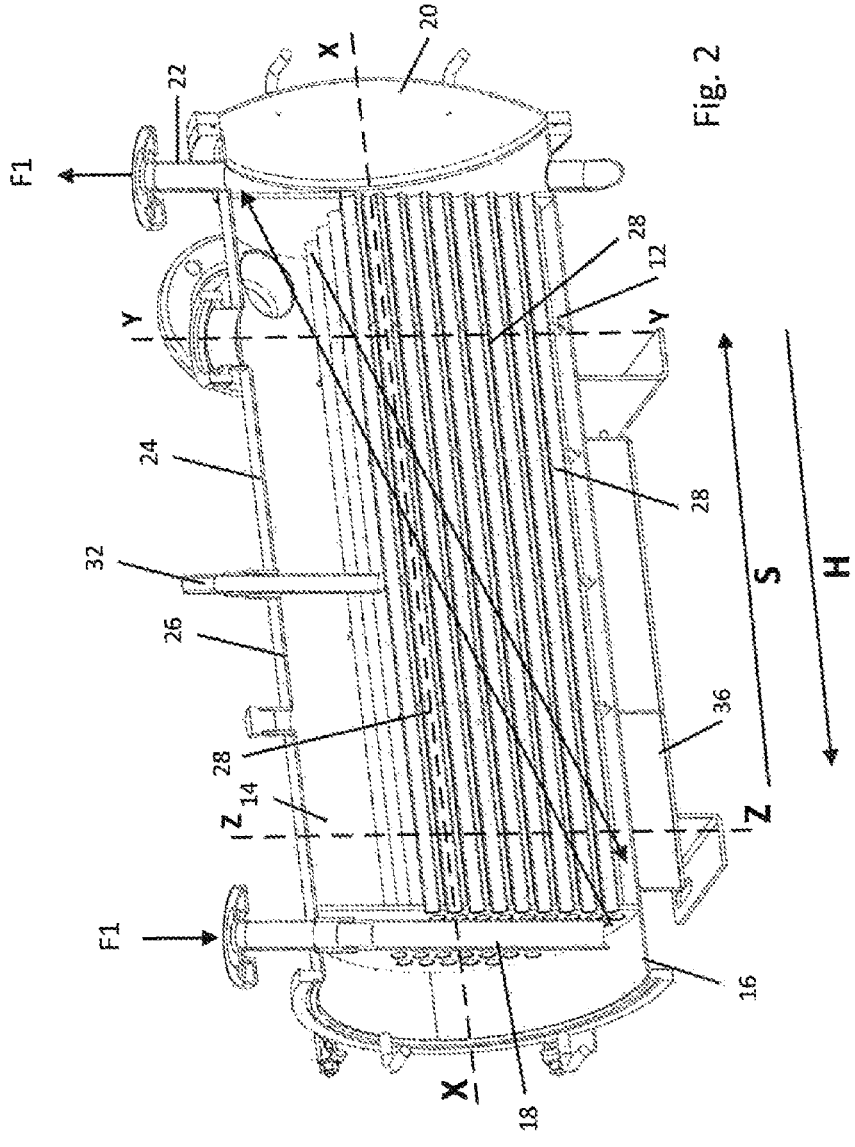
FIG. 2 shows a longitudinal sectional view of the heat exchanger installed in the process water distillation system according to FIG. 1.
Figure 3:
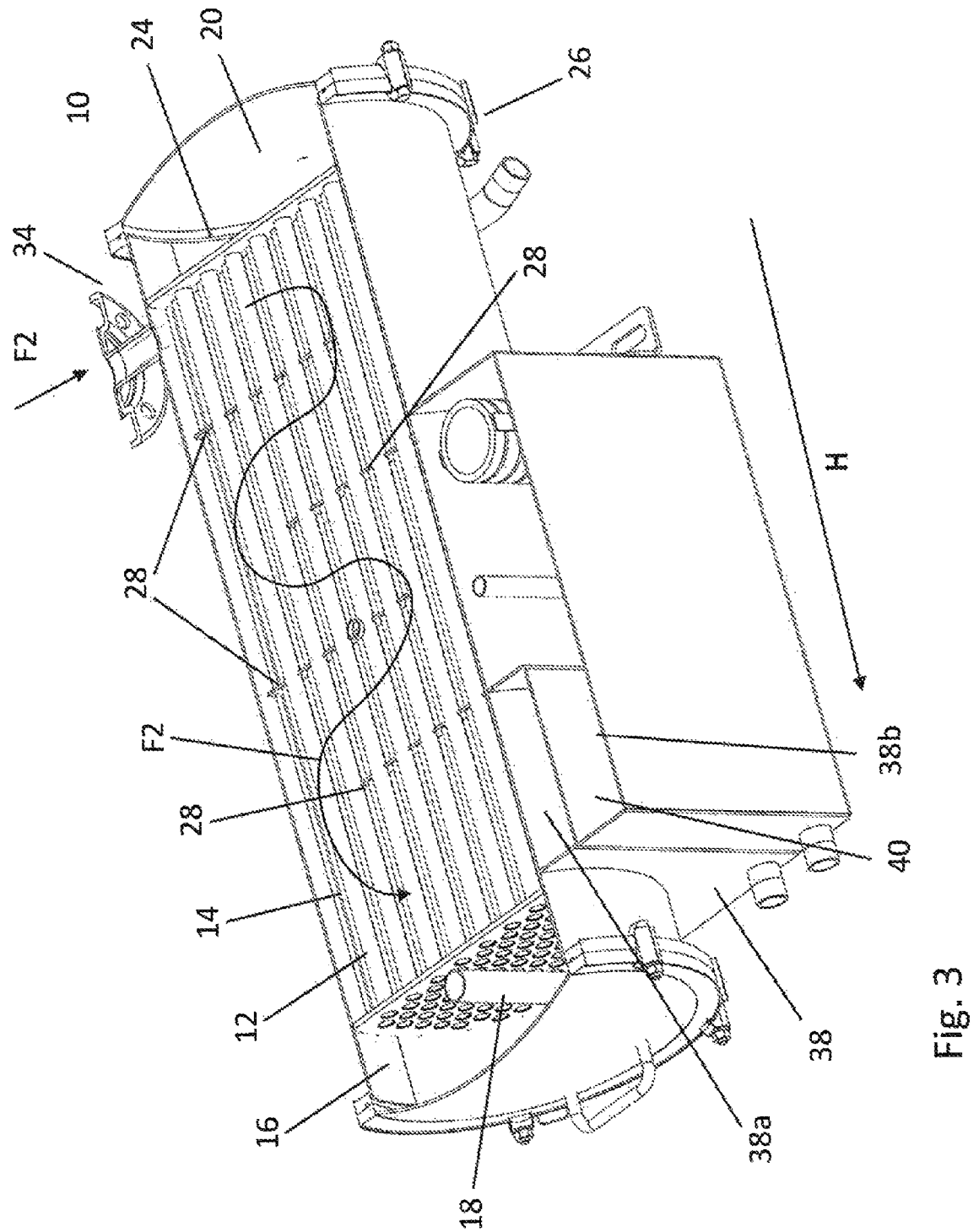
FIG. 3 shows a further longitudinal sectional view of the heat exchanger according to FIG. 2, cut along a line X-X in FIG. 2.

A process water distillation system 100 shown in FIG. 1 comprises a distillation vessel 102 in which a tube bundle 104 is arranged. Process water to be purified, which may contain impurities such as silicones, siloxanes, glycols, emulsifiers, surfactants or salts as well as light liquids such as gasoline, benzene, lubricants or oils, is supplied to the distillation vessel 102 via a supply tube 106. In an evaporator 108, which is provided in an area of the vessel 102 receiving the tube bundle 104, the process water is heated and thereby evaporated, whereby low-volatility impurities are collected in a sump 110 of the vessel 102 and can be discharged from the distillation vessel 102 via a concentrate drain 112. In the process water distillation system 100 shown here, evaporation takes place at a reduced pressure compared to atmospheric pressure, wherein a compressor 114 designed here as a vapor compressor ensures that the desired pressure conditions are set in the process water distillation system 100.

Water vapor rising in the distillation vessel 102 is directed through a mist separator 116 and conveyed into a condenser 118 by means of the compressor 114. The condenser 118 is defined by an internal volume of the tubes of the tube bundle 104. The distillate cooled in the condenser 118 and thereby condensed is finally conducted into a heat exchanger 10 via a connecting line 120 and further cooled as it flows through the heat exchanger 10. In the heat exchanger 10, the distillate is brought into thermal contact with process water to be fed into the distillation vessel 102 of the process water distillation system 100. The heat exchanger 10 is therefore used in the process water distillation system 10 as a process water preheater/distillate cooler.

The structure and mode of operation of the heat exchanger 10 are described in more detail below with reference to FIGS. 2 to 6. The heat exchanger 10 comprises a first flow path 12 which is configured to be flown through with a first fluid F1 to be heated and which, in the exemplary embodiment of the heat exchanger 10 shown here, is defined by an internal volume of a plurality of tubes of a tube bundle 14 which are arranged substantially parallel to one another. When the heat exchanger 10 is used in the process water distillation system 100 as shown in FIG. 1, the first fluid F1 to be conducted through the first flow path 12 is the process water to be purified in the process water distillation system 100.

An upstream region of the first flow path 12, i.e. an inlet region of the tube bundle 14, is connected to an inlet chamber 16. An inlet 18 of the first flow path 12, through which the first fluid F1 is conducted into the first flow path 12, opens into a bottom region of the inlet chamber 16, see in particular FIG. 2. In contrast, a downstream region of the first flow path 12, i.e. an outlet region of the tube bundle 14, opens into an outlet chamber 20. An outlet 22 of the first flow path 12, through which the first fluid F1 emerging from the first flow path 12 is conducted into the supply tube 106 connecting the heat exchanger 10 to the distillation vessel 102 of the process water distillation system 10, is connected to an upper region of the outlet chamber 20, see in particular FIG. 2.

Furthermore, the heat exchanger 12 comprises a second flow path 24 which configured to be flown through with a second fluid F2 to be cooled and which is in thermal contact with the first flow path 12. When the heat exchanger 10 is used in the process water distillation system 100 as shown in FIG. 1, the second fluid F2 to be conducted through the second flow path 24 is the distillate discharged from the condenser 118 of the process water distillation system 100.

In the exemplary embodiment of the heat exchanger 10 shown here, the second flow path 24 is defined by an internal volume of a vessel 26 in which the first flow path 12, i.e. the tube bundle 14, is fluidically separated from the second flow path 24 defined by the internal volume of the vessel 26. Mixing of the second fluid F2 with the first fluid F1 is thus excluded, but the second fluid F2 flows around the first flow path 12, i.e. the tube bundle 14, so that during operation of the heat exchanger 10 a heat transfer takes place from the second fluid F2 flowing through the second flow path 24 to the first fluid F1 flowing through the first flow path 12. As a result, the first fluid F1 is heated as it flows through the heat exchanger 10, whereas the second fluid F2 is cooled as it flows through the heat exchanger 10. A main flow direction H of the second fluid F2 through the second flow path 24 is opposite to the flow direction S of the first fluid F1 through the first flow path 12. The heat exchanger 10 therefore operates according to the counterflow principle.

The second flow path 24 of the heat exchanger 10 is designed such that a flow of the second fluid F2, upon being fed into the second flow path 24 and/or upon flowing through the second flow path 24 is calmed. In the exemplary embodiment of the heat exchanger 10 shown here, the second flow path 24 defined by the internal volume of the vessel 26 has a larger flow cross-section than the connecting line 120 through which the second fluid F2 is conducted into the second flow path 24 of the heat exchanger 10. Furthermore, a surface area of the second fluid F2 increases when the second fluid F2 is fed into the second flow path 24. As a result, turbulences are reduced and the flow velocity of the second fluid F2 is decreased, so that the flow of the second fluid F2 is calmed overall.

The calming of the flow of the second fluid F2 in the second flow path 24 causes the second fluid F2 to segregate under the influence of gravity, at least when the second fluid F2 contains fluid components of different specific densities. In particular, fluid components of lower specific density, such as light liquid droplets, collect on a surface of the second fluid F2 and form a floating layer 30 there, see FIGS. 4 and 5. The first flow path 12 is designed and arranged such that its outer surface acts as a coalescing element for improving a separation efficiency of the fluid component to be separated from the second fluid F2 from the second fluid F2. In particular, outer surfaces of the tube bundle 14, the inner volume of which defines the first flow path 12, serve as separation surfaces for the fluid component to be separated from the second fluid F2.

The fluid components collecting on the surface of the second fluid F2 in the floating layer 30 are sucked from the surface of the second fluid F2 in the second flow path 24 by means of a suction device 32. In the exemplary embodiment of the heat exchanger 10 shown here, the suction device 32 comprises a suction lance which protrudes into the second flow path 24, i.e. the vessel 26, and ends at the level of the surface level of the second fluid F2 in the second flow path 24, so that the floating layer 30 forming on the surface of the second fluid F2 can be sucked off with the aid of the suction lance. Consequently, the heat exchanger 10 not only fulfills a heat exchanger function, but also a separator function and can therefore be used in the process water distillation system 100, for example, as a combined heat exchanger/separator by means of which, for example, light liquids such as oil are separated from the distillate, which cannot be removed or cannot be completely removed from the process water by the distillation process.

Figure 4:
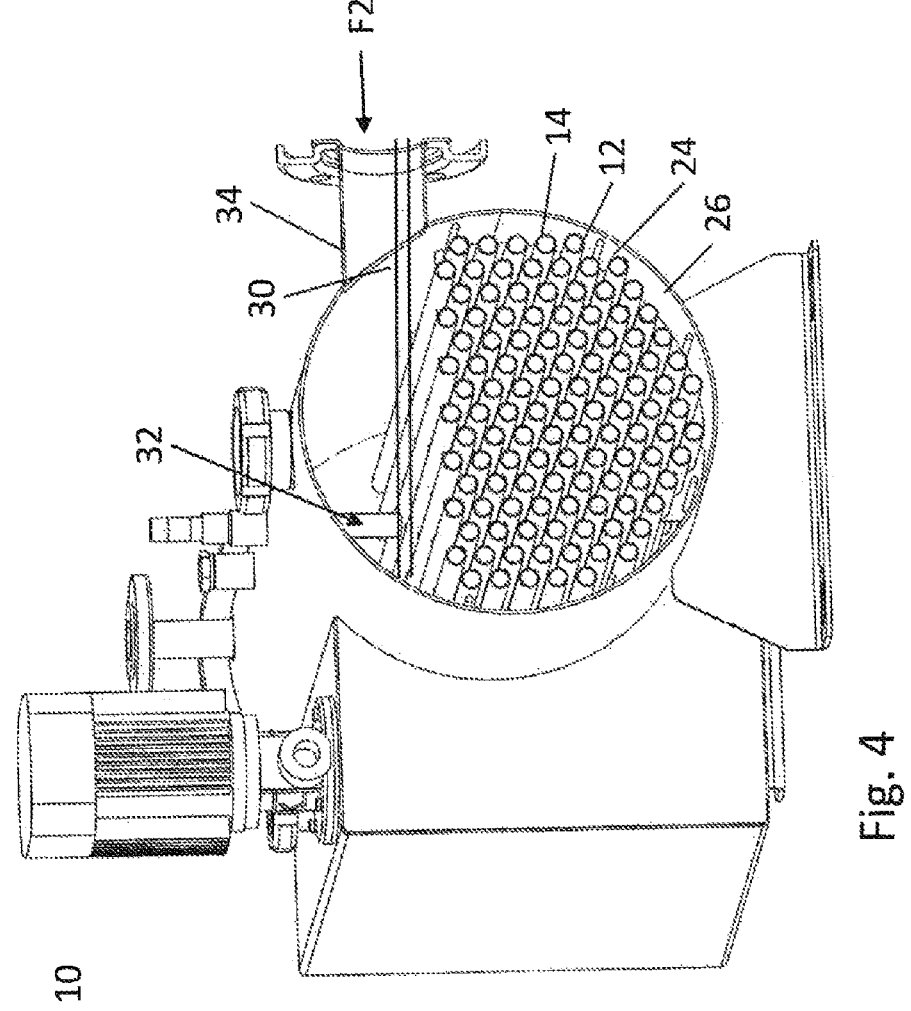
FIG. 4 shows a cross-sectional view of the heat exchanger according to FIG. 2, cut along a line Y-Y in FIG. 2.
Figure 5:
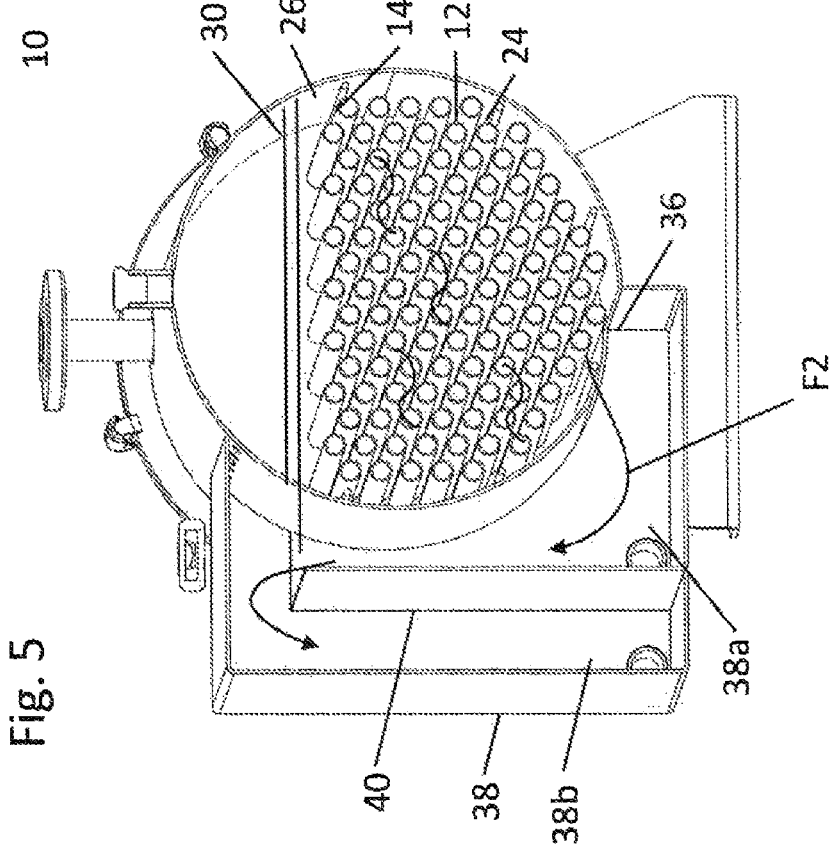
FIG. 5 shows a further cross-sectional view of the heat exchanger according to FIG. 2, cut along a line Z-Z in FIG. 2.

As can best be seen in FIG. 4, an inlet 34 of the second flow path 24 is designed and arranged such that the second fluid F2 fed into the second flow path 24 is fed into the second flow path 24 substantially parallel to a surface level of the second fluid F2 in the second flow path 24 and substantially at a level with the surface level of the second fluid F2 in the second flow path 24. In the exemplary embodiment of the heat exchanger 10 shown here, the inlet 34 of the second flow path 24 opens in an upstream region of the second flow path 24 into an upper region of the vessel 26, so that a "gentle", vortex-free inlet of the second fluid F2 into the second flow path can be realized.

In contrast, an outlet 36 of the second flow path 24 is designed and arranged such that the second fluid F2 is discharged from the second flow path 24 after flowing through the second flow path 24 from a sump region of the second flow path 24. In the exemplary embodiment of the heat exchanger 10 shown here, the outlet 36 of the second flow path 24 is arranged in a downstream region of the second flow path 24 in a bottom region of the vessel 26, see FIGS. 2 and 5.

By combining an inlet 34 arranged in the area of the surface level of the second fluid F2 in the second flow path 24 with an outlet 36 arranged in the sump area of the second flow path 24, a heat flow W2 running in the vessel 26 in a diagonal direction from top to bottom is realized for the second fluid F2, i.e. the second fluid F2 is increasingly cooled in the direction symbolized by the heat flow W2. Conversely, a heat flow W1 results for the first fluid F1, which runs in the vessel 26 in a diagonal direction from bottom to top, i.e. the first fluid F1 is increasingly heated in the direction symbolized by the heat flow W1.

In the second flow path 24, i.e. inside the vessel 26, a plurality of flow-directing elements 28 are provided, which are arranged one behind another with respect to the main flow direction H of the second fluid F2 through the second flow path 24 and offset with respect to one another in a direction perpendicular to the main flow direction H of the second fluid F2. A resulting flow S2 of the second fluid F2 meandering about the main flow direction H through the second flow path 24 is generated by the flow-directing elements 28, which are designed here in the form of plate-shaped separating plates, see in particular FIG. 3.

A downstream region of the second flow path 24 is connected to a receiving chamber 38 for receiving the second fluid F2 discharged from the second flow path 24. The receiving chamber 38 comprises a first section 38a and a second section 38b arranged downstream of the first section 38a, which is separated from the first section 38a by an overflow device 40, see FIG. 5. Second fluid F2 emerging from the second flow path 24 thus always flows first into the first section 38a of the receiving chamber 38 and only then into the second section 38b of the receiving chamber 38 via the overflow device 40. This regulates the level of the surface level of the second fluid F2 in the second flow path 24, i.e. the vessel 26. The overflow device 40 is designed and arranged, i.e. an upper edge of the overflow device 40 is placed at such a height, that the second fluid F2 flowing through the second flow path 24 flows completely around the first flow path 12.

In the embodiment of the heat exchanger 10 illustrated in FIGS. 2 to 5, the first flow path 12, the inlet chamber 16 and the outlet chamber 20 are designed and arranged such that the first fluid F1 flows through the first flow path 12 in a constant flow direction S along the entire length of the first flow path 12. The flow direction S of the first fluid F1 through the first flow path 12 is determined by the design of the tubes of the tube bundle 14. Similarly, the second flow path 24, the inlet 34 of the second flow path 24 and the outlet 36 of the second flow path 24 are designed and arranged such that the second fluid F2 flows through the second flow path 24 along the entire length of the second flow path 24 in a constant main flow direction H.

Figure 6:
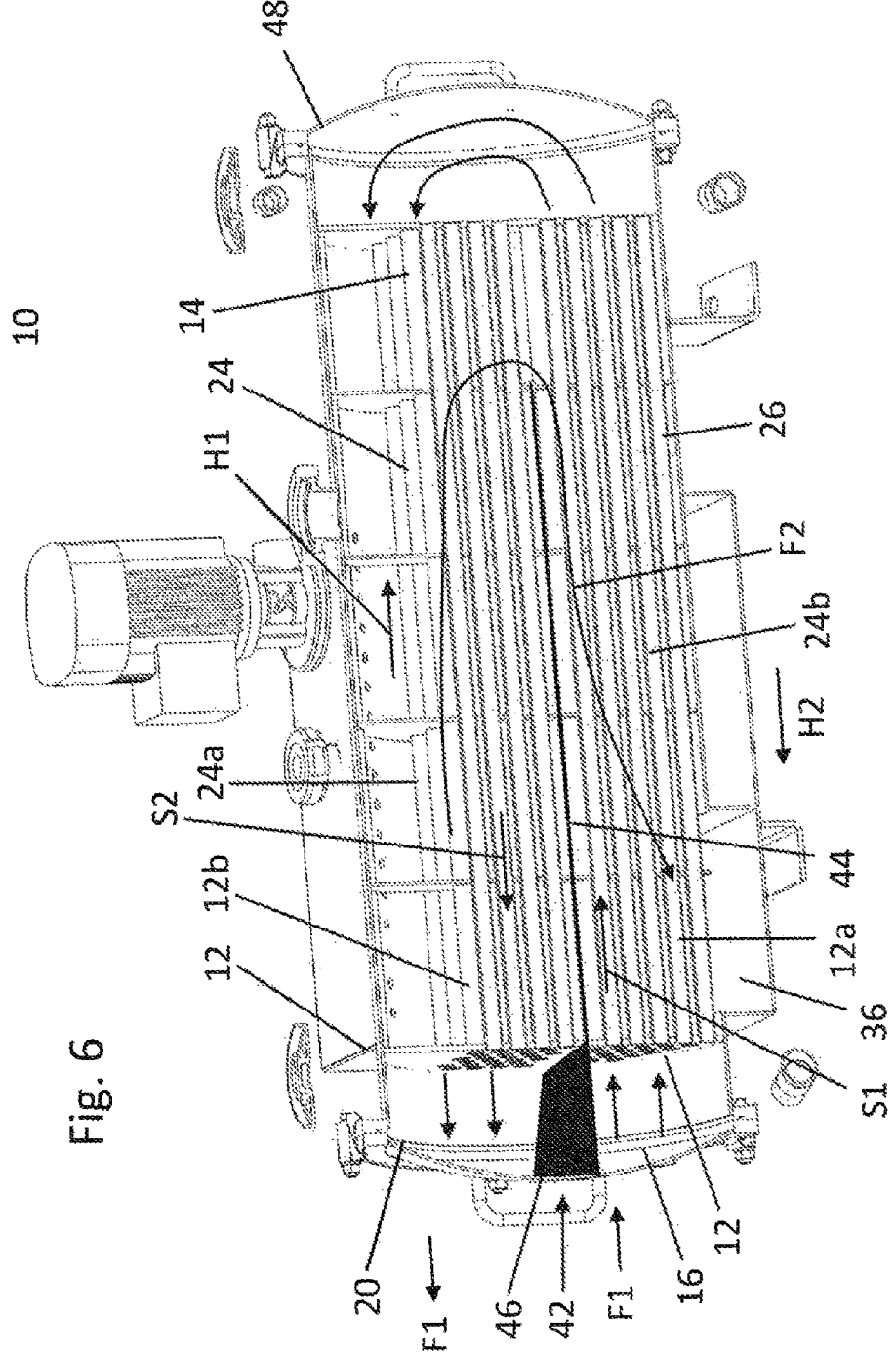
FIG. 6 shows an alternative embodiment of a heat exchanger suitable for use in a process water distillation system according to FIG. 1.

The variant of the heat exchanger 10 shown in FIG. 6 differs from the arrangement according to FIGS. 2 to 5 in that a flow deflection device 42 is arranged in the second flow path 12, which deflects the flow of the second fluid F2 through the second flow path 24 in such a way that the second fluid F2 flows through the second flow path 24 along a first section 24a of the second flow path 24 in a first main flow direction H1 and along a second section 24b of the second flow path 24 in a second main flow direction H2 opposite to the first main flow direction H1. Accordingly, in the variant of the heat exchanger 10 shown in FIG. 6, the main flow direction H of the second fluid F2 is reversed.

The inlet 34 of the second flow path 24 opens in an upstream region of the first section 24a of the second flow path 24 into an upper region of the vessel 26. In contrast, the outlet 36 of the second flow path 24 is arranged in a downstream region of the second section 24b of the second flow path 24 in a bottom region of the vessel 26. The flow deflection device comprises a first separating plate 44, which divides the second flow path 24 into the first section 24a and the second section 24b and fluidically separates an upstream region of the first section 24a of the second flow path 24 and a downstream region of the second section 24b of the second flow path 24. In contrast, a downstream region of the first section 24a of the second flow path 24 and an upstream region of the second section 24b of the second flow path 24 are fluidically connected to one another. The flow reversal of the second fluid F2 then takes place in this region of the second flow path 24.

However, the operating mode of the heat exchanger 10 in the counterflow principle is maintained by a corresponding reversal of the flow direction S of the first fluid F1 in the first flow path 12. For this purpose, the first flow path 12, the inlet chamber 16 and the outlet chamber 20 are designed and arranged such that the first fluid F1 flows through the first flow path 12 along a first section 12a of the first flow path 12 in a first flow direction S1 and along a second section 12b of the first flow path 12 in a second flow direction S2 opposite to the first flow direction S1.

The inlet chamber 20 and the outlet chamber 22 are arranged one above another in a direction substantially perpendicular to the first flow direction S1 of the first fluid F1 along the first section 12a of the first flow path 12 and substantially perpendicular to the second flow direction S2 of the first fluid F1 along the second section 12b of the first flow path 12. Accordingly, the first section 12a of the first flow path 12 is formed by a lower part of the tube bundle 14, while the second section 12b of the first flow path 12 is formed by an upper part of the tube bundle 14.

The inlet chamber 16 and the outlet chamber 20 are fluidically separated from each other by a second separating plate 46 formed integral with the first separating plate 44, so that the first fluid F1 is prevented from passing from the inlet chamber 16 into the outlet chamber 20 without flowing through the first flow path 12. A downstream end of the first section 12a of the first flow path 12 and an upstream end of the second section 12b of the first flow path 12 are connected to a flow deflection chamber 48, which is designed and arranged such that first fluid F1 flowing in the first flow direction S1 from the first section 12a of the first flow path 12 into the flow deflection chamber 48 is deflected and directed into the second section 12b of the first flow path 12 in the second flow direction S2 opposite to the first flow direction S1. The inlet chamber 16 and the outlet chamber 20 on the one hand and the flow deflection chamber 48 on the other hand are thus connected to opposite ends of the first flow path 12, i.e. to opposite ends of the tubes of the tube bundle 14.

In all other respects, the structure and mode of operation of the heat exchanger 10 shown in FIG. 6 correspond to the structure and mode of operation of the arrangement shown in FIGS. 2 to 5.

The invention claimed is:

1. A process water distillation system comprising:
an evaporator;
a condenser;

a compressor configured to generate a desired pressure in at least a region of the process water distillation system and to convey steam from the evaporator into the condenser; and
a heat exchanger comprising:
a first flow path configured to be flown through with a first fluid to be heated;
a second flow path configured to be flown through with a second fluid to be cooled, the second flow path being in thermal contact with the first flow path at least in sections, and the second flow path being configured to reduce turbulences within a flow of the second fluid, upon being fed into the second flow path and/or upon flowing through the second flow path; and
a suction device configured to suck a fluid component, which separates from the second fluid while the second fluid is fed into the second flow path and/or flows through the second flow path, from a surface of the second fluid in the second flow path,
wherein, during operation of the process water distillation system, the first fluid to be heated, which flows through the first flow path of the heat exchanger, is process water to be purified and the second fluid to be cooled, which flows through the second flow path of the heat exchanger, is distillate emerging from the condenser.

2. The process water distillation system according to claim 1, wherein:
at least a section of the second flow path is defined by an internal volume of a vessel in which the first flow path is arranged fluidically separated from the second flow path, so that the second fluid flowing through the second flow path flows around the first flow path; and/or
a plurality of flow-directing elements are provided in at least a section of the second flow path, which are arranged one behind another with respect to a main flow direction of the second fluid through the second flow path and offset with respect to one another in a direction perpendicular to the main flow direction of the second fluid through the second flow path; and/or
an inlet of the second flow path is designed and arranged such that the second fluid fed into the second flow path is fed into the second flow path substantially parallel to a surface level of the second fluid in the second flow path and/or substantially at a level with the surface level of the second fluid in the second flow path, wherein the inlet of the second flow path opens in an upstream region of the second flow path into an upper region of the vessel, the internal volume of which defines at least a section of the second flow path; and/or
an outlet of the second flow path is designed and arranged such that the second fluid is discharged from the second flow path after flowing through the second flow path from a sump region of the second flow path, the outlet of the second flow path being arranged in a downstream region of the second flow path in a bottom region of the vessel, the internal volume of which defines at least a section of the second flow path.

3. The process water distillation system according to claim 2, wherein:
the second flow path, the inlet of the second flow path, and the outlet of the second flow path are designed and arranged such that the second fluid flows through the second flow path along an entire length of the second flow path in a constant main flow direction; or a flow deflection device is arranged in the second flow path, which is configured to deflect the flow of the second fluid through the second flow path such that the second fluid flows through the second flow path along a first section of the second flow path in a first main flow direction and along a second section of the second flow path in a second main flow direction opposite to the first main flow direction.

4. The process water distillation system according to claim 3, wherein:

the inlet of the second flow path opens in an upstream region of the first section of the second flow path into the upper region of the vessel, the internal volume of which defines at least a section of the second flow path; and/or the outlet of the second flow path is arranged in a downstream region of the second section of the second flow path in the bottom region of the vessel, the internal volume of which defines at least a section of the second flow path; and/or the flow deflection device comprises a first separating plate which divides the second flow path into the first section and the second section, the first separating plate being designed and arranged such that the upstream region of the first section of the second flow path and the downstream region of the second section of the second flow path are fluidically separated from one another, and/or the first separating plate being designed and arranged such that a downstream region of the first section of the second flow path and an upstream region of the second section of the second flow path are fluidically connected to one another.

5. The process water distillation system according to claim 1, wherein:

at least a section of the first flow path is defined by an inner volume of a plurality of tubes arranged substantially parallel to each other; and/or a flow direction of the first fluid through the first flow path is directed opposite to a main flow direction of the second fluid through the second flow path; and/or an inlet of the first flow path opens into a bottom region of an inlet chamber which is connected to an upstream region of the first flow path; and/or an outlet of the first flow path is connected to an upper region of an outlet chamber which is connected to a downstream region of the first flow path.

6. The process water distillation system according to claim 5, wherein:

the first flow path, the inlet chamber, and the outlet chamber are designed and arranged such that the first fluid flows through the first flow path along an entire length of the first flow path in a constant flow direction; or the first flow path, the inlet chamber, and the outlet chamber are designed and arranged such that the first fluid flows through the first flow path along a first section of the first flow path in a first flow direction and along a second section of the first flow path in a second flow direction opposite to the first flow direction.

7. The process water distillation system according to claim 6, wherein:

the inlet chamber and the outlet chamber are arranged one above another in a direction substantially perpendicular to the first flow direction of the first fluid along the first section of the first flow path and substantially perpendicular to the second flow direction of the first fluid along the second section of the first flow path; and/or the inlet chamber and the outlet chamber are separated from each other by a second separating plate; and/or a downstream end of the first section of the first flow path and an upstream end of the second section of the first flow path are connected to a flow deflection chamber which is designed and arranged such that the first fluid flowing in the first flow direction from the first section of the first flow path into the flow deflection chamber is deflected and directed into the second section of the first flow path in the second flow direction opposite to the first flow direction.

8. The process water distillation system according to claim 1, wherein a downstream region of the second flow path is connected to a receiving chamber for receiving the second fluid discharged from the second flow path, wherein the receiving chamber comprises a first section and a second section arranged downstream of the first section and separated from the first section by an overflow device, and wherein the overflow device is designed and arranged such that the second fluid flowing through the second flow path flows completely around the first flow path.

9. The process water distillation system according to claim 1, wherein at last a section of the first flow path is designed and arranged such that its outer surface acts as a coalescing element for improving a separation efficiency of the fluid component from the second fluid.

10. The process water distillation system according to claim 1, wherein the second fluid discharged from the second flow path is received in a receiving chamber which is connected to a downstream region of the second flow path, wherein the receiving chamber comprises a first section and a second section arranged downstream of the first section and separated from the first section by an overflow device, and wherein the overflow device is designed and arranged such that the second fluid flowing through the second flow path flows completely around the first flow path.

11. A method for operating a heat exchanger provided use in a process water distillation system, the method comprising:

conducting a first fluid to be heated through a first flow path, wherein the first fluid comprises process water;

conducting a second fluid to be cooled through a second flow path, wherein the second fluid comprises distillate, wherein the second flow path is in thermal contact with the first flow path at least in sections, and wherein turbulences within a flow of the second fluid, upon being fed into the second flow path and/or upon flowing through the second flow path are reduced; and sucking a fluid component, which separates from the second fluid while the second fluid is fed into the second flow path and/or flows through the second flow path, from a surface of the second fluid in the second flow path.

12. The method according to claim 11, wherein:

the second fluid flowing through the second flow path flows around the first flow path; and/or a flow of the second fluid through the second flow path is deflected by a plurality of flow-directing elements which are arranged one behind another with respect to a main flow direction of the second fluid through the second flow path and offset with respect to one another in a direction perpendicular to the main flow direction of the second fluid through the second flow path; and/or the second fluid is fed into the second flow path substantially parallel to a surface level of the second fluid in the second flow path and/or substantially at a level with a surface level of the second fluid in the second flow path; and/or the second fluid is discharged from the second flow path after flowing through the second flow path from a sump region of the second flow path.

13. The method according to claim 11, wherein:

the second fluid flows through the second flow path along an entire length of the second flow path in a constant main flow direction, or the flow of the second fluid through the second flow path is deflected such that the second fluid flows through the second flow path along a first section of the second flow path in a first main flow direction and along a second section of the second flow path in a second main flow direction opposite to the first main flow direction.

14. The method according to claim 11, wherein:

the first fluid flows through the first path along an entire length of the first flow path in a constant flow direction; or of the first flow path in a constant flow direction; or the first fluid flows through the first flow path along a first section of the first flow path in a first flow direction and along a second section of the first flow path in a second flow direction opposite to the first flow direction.

* * * * *